United States Patent [19]
Washizu

[11] Patent Number: 4,913,467
[45] Date of Patent: Apr. 3, 1990

[54] CONNECTOR FOR CONNECTING SMALL DIAMETER PIPE

[75] Inventor: Katsushi Washizu, Shizuoka, Japan

[73] Assignee: Usui Kokusai Sangyo Kaisha Ltd., Shizuoka, Japan

[21] Appl. No.: 317,647

[22] Filed: Mar. 1, 1989

[30] Foreign Application Priority Data

Mar. 3, 1988 [JP] Japan .............................. 63-28380[U]

[51] Int. Cl.$^4$ ............................................. F16L 39/00
[52] U.S. Cl. ...................................... 285/39; 285/319; 285/93
[58] Field of Search .................. 285/319, 39, 169, 174, 285/351, 93, 81, 82

[56] References Cited

U.S. PATENT DOCUMENTS

| | | | |
|---|---|---|---|
| 2,892,991 | 6/1959 | Beebee | 285/93 X |
| 3,453,005 | 7/1969 | Foults | 285/82 |
| 3,826,523 | 7/1974 | Eschbaugh | 285/319 X |
| 4,035,005 | 7/1977 | DeVincent | 285/319 |
| 4,637,636 | 1/1987 | Guest | 285/39 X |
| 4,681,351 | 7/1987 | Bartholomew | 285/319 |
| 4,730,856 | 3/1988 | Washizu | 285/319 |
| 4,778,203 | 10/1988 | Bartholomew | 285/319 X |
| 4,781,400 | 11/1988 | Cunningham | 285/39 |
| 4,793,637 | 12/1988 | Laipply | 285/39 |

Primary Examiner—Randolph A. Reese
Assistant Examiner—Carol I. Bordas
Attorney, Agent, or Firm—Anthony J. Casella; Gerald E. Hespos

[57] ABSTRACT

A connector for connecting a small diameter pipe is disclosed. The connector comprises a joint body formed with an insertion bore for a conduit and having large, intermediate and small diameter portions, the intermediate diameter portion being fitted with a seal ring, and a ring-like holder provided with a pair of elastic pawls engaging with an opening of the large diameter portion. When inserting the conduit into the insertion bore, the conduit fits to the seal ring, while holder pawls engage with an annular protrudent wall of the conduit, thus positioning the conduit and preventing its removal. The connector also includes a ring-like confirmative member provided with a pair of elastic pawls capable of engaging with grooves of the holder pawls. The positions of confirmative member pawls are determined between the holder pawls and the opening wall. The confirmative member further includes elastic deformable pieces formed on the pawls or on the ring thereof, corresponding to projections provided on the joint body.

7 Claims, 6 Drawing Sheets

PRIOR ART

CONNECTOR FOR CONNECTING SMALL DIAMETER PIPE

BACKGROUND OF THE INVENTION

1. Field of the Invention:

The present invention relates to a connector for connecting a metallic or resinous pipe having a relatively small diameter of 20mm or less, which is disposed as a supply passageway for supplying oil and air commonly to an automobile or a variety of machineries and equipments.

2. Description of the Prior Art:

A prior art connector of this type is, as illustrated in FIG. 11, arranged in such a manner that: a joint body formed, in its axial core, with an insertion bore for a conduit 1 includes insertion holes formed in a large diameter portion, an intermediate diameter portion and a small diameter portion in sequence from an inlet thereof; the intermediate diameter portion is fitted with a seal ring 3; conduit 1 is inserted into the insertion bore to cause the conduit outer peripheral surface to be elastically joined to seal ring 3; on the other hand, a ring-like holder 4 provided at its one ends with a pair of protrudent elastic pawls 4a is fitted in an opening 2a formed in the large diameter portion of joint body 2; and elastic pawls 4a are forced to engage with an annular protrudent wall 1a shaped on the outer periphery of conduit 1, thus positioning conduit 1 and preventing the removal thereof. Note that the symbol 2b represents a communication bore, the numeral 5 designates a bush, 6 denotes a spacer and 7 stands for a hose.

There arise, however, the following problems inherent in the conventional connector for connecting the small diameter pipe. As depicted in FIGS. 12 and 13, even if conduit 1 is tightly secured to joint body 2, no axial force is exerted thereon from outside, and no leakage of a liquid is caused under a low internal pressure. Therefore, any drawbacks can not be detected by taking a glance at the apperance, and it follows that such drawbacks are present while being placed on the market.

SUMMARY OF THE INVENTION

It is a primary object of the present invention which is made to eliminate the foregoing problems incidental to the prior art to provide a connector capable of enhancing the security and also detecting drawbacks by observing the appearance even though a holder disengages from a joint body due to a mistake in operating a conduit.

To this end, according to one aspect of the invention, there is provided a connector for connecting a small diameter pipe, comprising: a conduit; a joint body formed, in its axial core as in a conventional manner, with an insertion bore for the conduit and including insertion holes formed in a large diameter portion, an intermediate diameter portion and a small diameter portion in sequence from an inlet thereof; a seal ring attached to the intermediate diameter portion and elastically joined to the conduit outer peripheral surface by inserting the conduit into the insertion bore; a ring-like holder provide at its one ends with a pair of elastic pawls; and an opening, formed in the large diameter portion of the joint body, in which the holder is fitted; and an annular protrudent wall, shaped on the outer periphery of the conduit, with which the elastic pawls engage, thus positioning the conduit and preventing the removal thereof, characterized by a ring-like confirmative member provided at its one ends with a pair of protrudent elastic pawls capable of engaging with grooves chased in tip portions of pawls of the holder, the confirmative member being disposed movably in the axial direction from outside of the joint body and installed so that the tip portions of the pawls of the confirmative member are positioned between the pawl tip portions of the holder and the opening wall of the joint body.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Figure 1:
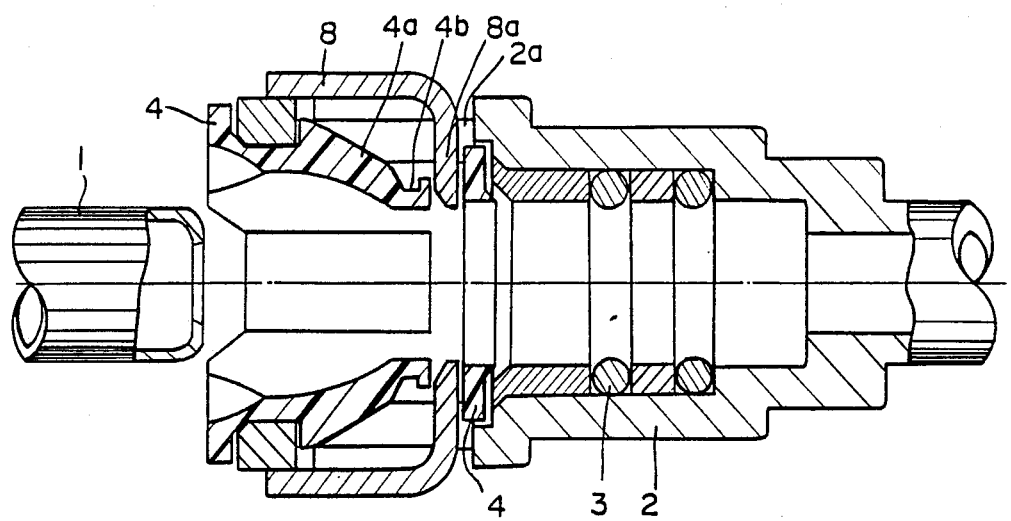
FIG. 1 is a vertical sectional view depicting a connector for connecting a small diameter pipe according to the present invention.
Figure 2:
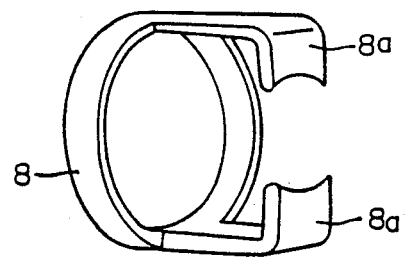
FIG. 2 is a perspective view illustrating a confirmative member.

Referring to FIGS. 1 and 2, a joint body generally designated at 2 includes an insertion bore, formed in the axial core, for a conduit 1. Joint body 2 also includes insertion holes formed in a large diameter portion, an intermediate diameter portion and a small diameter portion in sequence from an inlet thereof. A seal ring 3 is attached to the intermediate diameter portion. Seal ring 3 is forced to elastically fit to the conduit outer peripheral surface by intruding the conduit into the insertion bore. On the other hand, a ring-like holder 4 provided at its one ends with a pair of protrudent elastic pawls 4a is engaged with an opening 2a formed in the large diameter portion of joint body 2. Elastic pawls 4a are caused to engage with an annular protrudent wall 1a shaped on the outer periphery of conduit 1, thus positioning conduit 1 and preventing its removal. This arrangement is the same as that in the prior art. In accordance with the present invention, grooves 4b are chased in the tip portions of pawls 4a of holder 4 of the joint. Further, there is separately provided a ring-like confirmative member 8 formed at its one ends with a pair of elastic pawls 8a depicted in FIG. 2. Confirmative member 8 is installed so that the tip portions of pawls 8a of confirmative member 8 are positionally set between the pawl tips of holder 4 and the wall of opening 2a of joint body 2. In this case, the end of confirmative member 8 deviates with a dimension A from the end of joint body 2.

Figure 3:
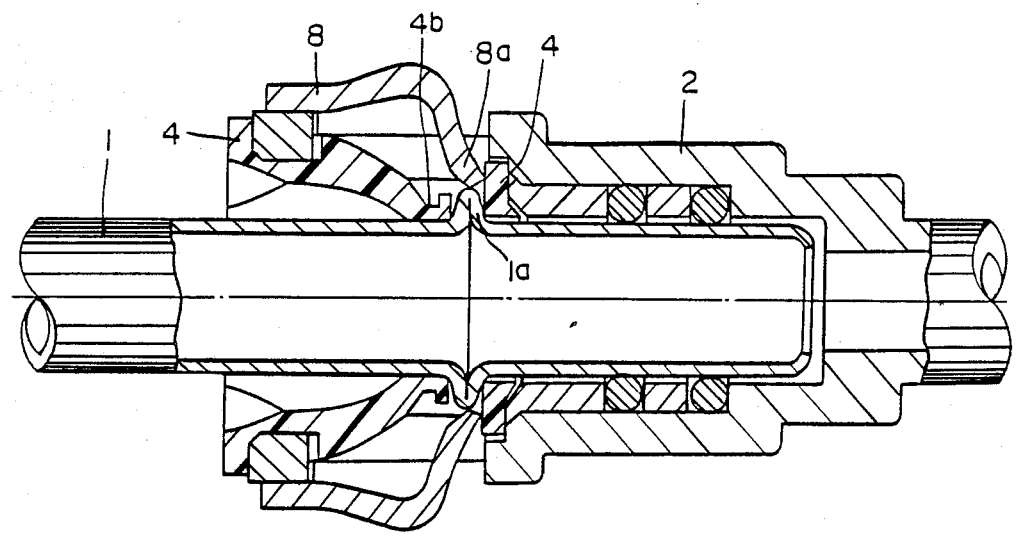
FIG. 3 is a sectional view showing a state where a conduit of the connector according to the present invention is installed.

According to the present invention having such a constitution, when intruding conduit 1 into joint body and securing it to the interior thereof, as illustrated in FIG. 3, annular protrudent wall 1a of conduit 1 behaves to expand the tip portions of pawls 8a of confirmative member 8, thereby releasing the engagement with the pawl tips of holder 4. As a result, confirmative member 8 becomes movable to the conduit in the axial direction (indicated by an arrow). This is a situation of installing the conduit.

Figure 4:
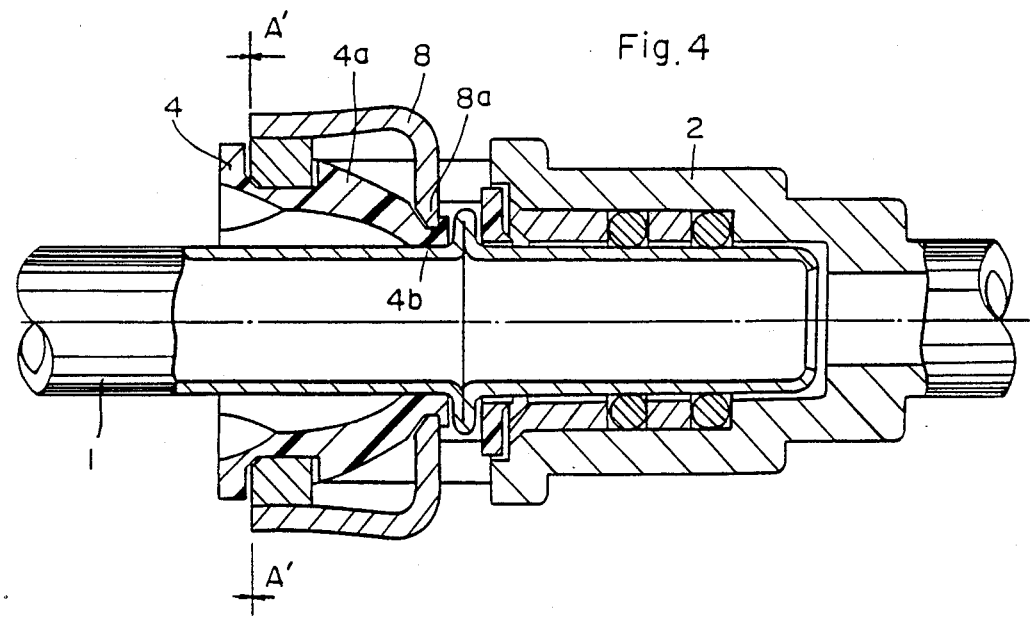
FIG. 4 is a sectional view showing a condition under which the installation of the conduit is confirmed.

In order to shift the foregoing installed state to a confirmative state, as illustrated in FIG. 4, confirmative member 8 is moved to the conduit in the axial direction, with the result that confimative member 8 is almost the same position (a dimension A') as the end of joint body 2. It is therefore possible to visually confirm that the conduit is in the normally installed state. Simulataneously, the tips of pawls 8a of confirmative member 8 are fitted in grooves 4b of pawl members 4a of the holder, thereby making it more confirmative to position conduit 1 and preventing its removal.

Figure 5:
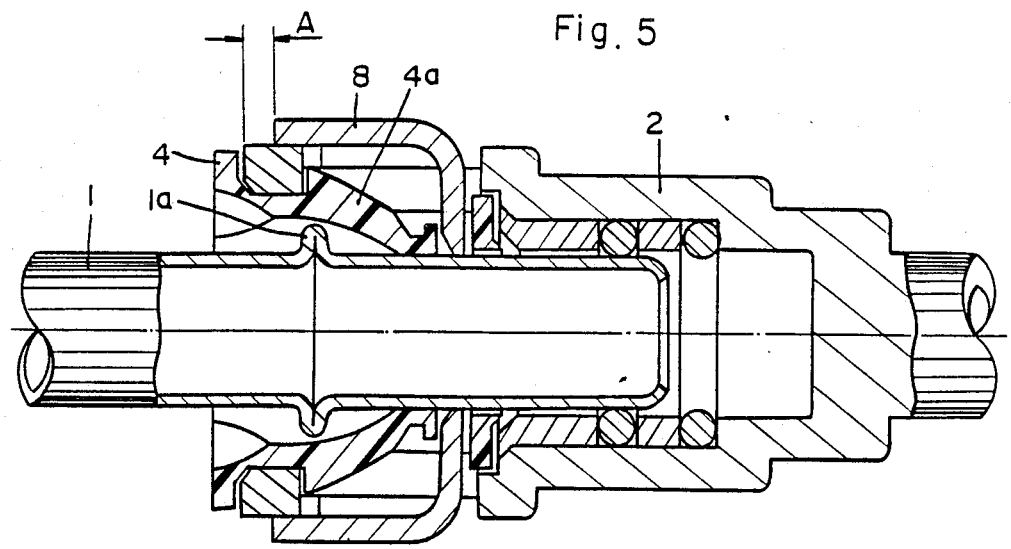
FIGS. 5 to 7 are sectional views each illustrating an ill-installed condition of the conduit.

Hence, for instance, in a conduit ill-installed state -1 depicted in FIG. 5, when positioning the pawl tips of confirmative member 8 between the pawl tips of the holder and the joint body as in a non-installed state of the conduit (see FIG. 1), confirmative member 8 is not allowed to move in the axial direction, so that the end of confirmative member 8 deviates with the dimension A from the end of joint body 2. The ill-installed condition can thus be detected.

Figure 6:
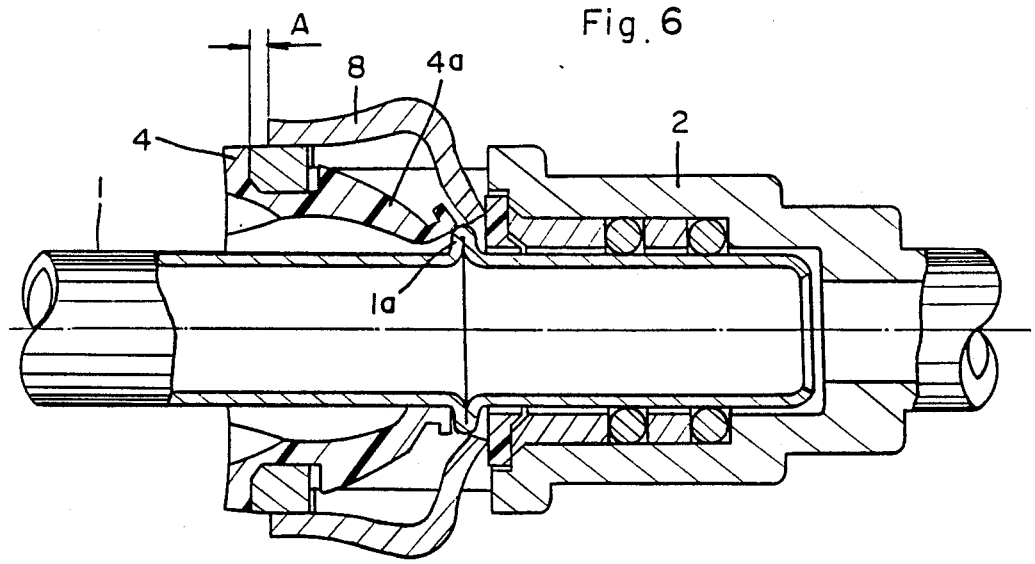

In a conduit ill-installed state -2 shown in FIG. 6, conduit 1 is intruded up to the normal position, and pawls 4a of holder 4 are not in the normal state. Even when the pawl tips of confirmative member 8 are expanded in this state, confirmative member 8 is hindered by the tips of pawls 4a of the holder, whereby confirmative member 8 can not move in the axial direction. In this case, the end of confirmative member 8 deviates with the dimension A from the end of joint body 2, thereby making it possible to detect the ill-installed condition.

Figure 7:
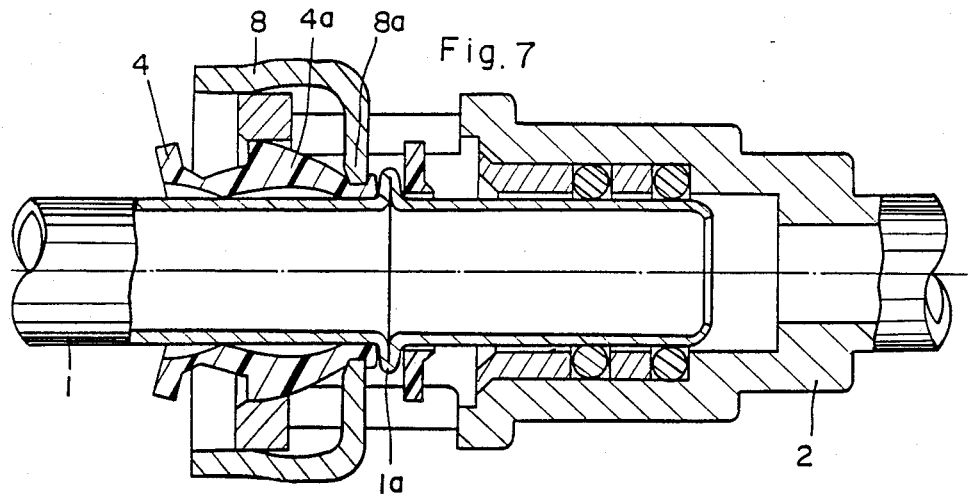

Furthermore, as depicted in FIG. 7, even when holder 4 disengages from joint body 2 due to a misoperation, in some cases confirmative member 8 functions to prevent the removal of conduit 1. In this case also, the ill-installed condition can be confirmed from a positional correlation between the end of confirmative member 8 and the end of joint body 2. Incidentally, the demounting of conduit 1 involves two steps of detaching pawls 4 of the holder and then pawls 8a of confirmative member 8, and hence there is no probability that conduit 1 is not mistakenly demounted.

Figure 8:
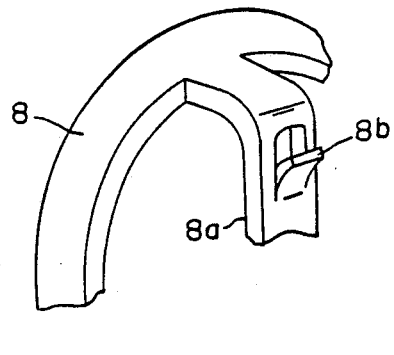
FIGS. 8 to 10 are explanatory views each showing a different embodiment of the confirmative member.
Figure 9:
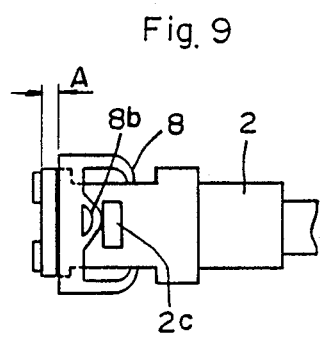
Figure 10:
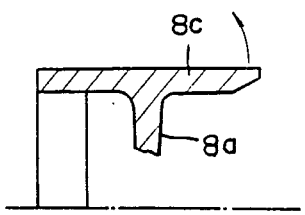
Figure 11:
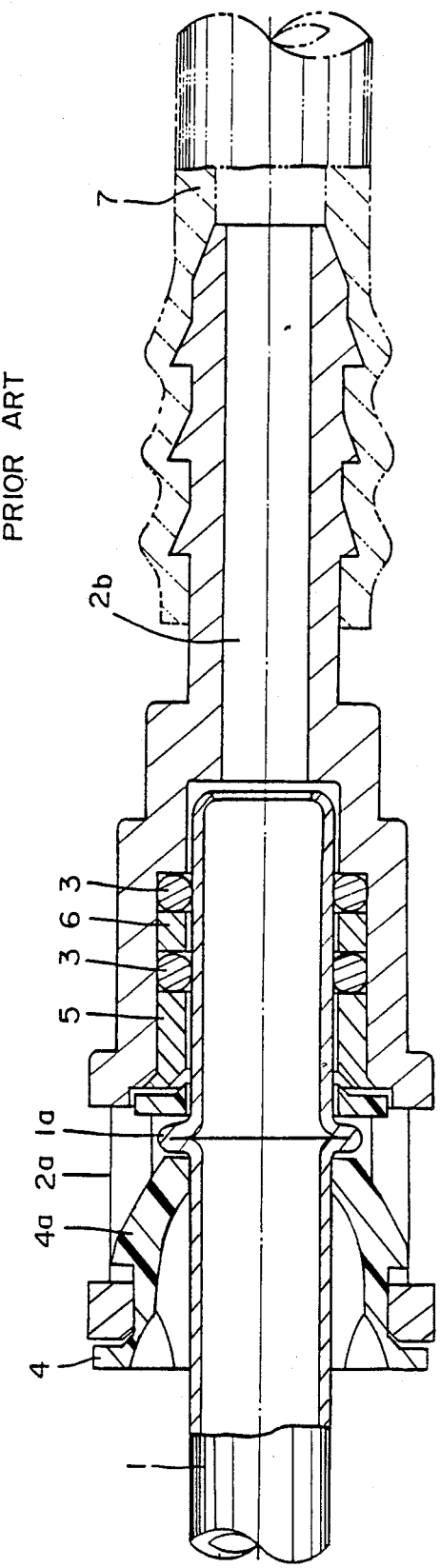
FIGS. 11 to 13 are sectional views each illustrating a conventional example.
Figure 13:
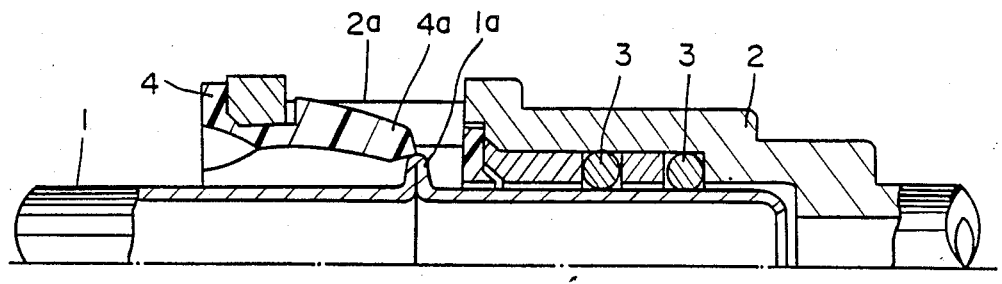
Figure 12:
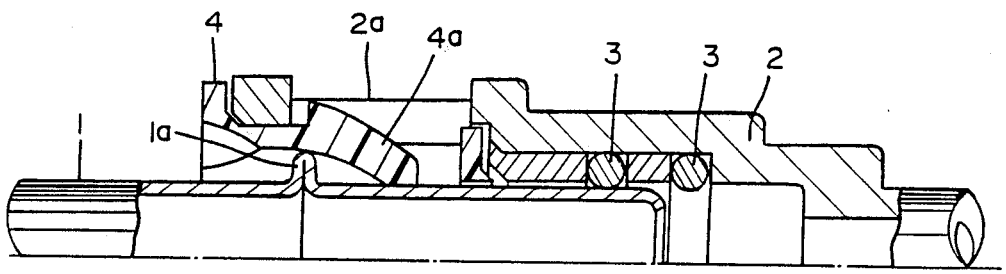

FIGS. 8 and 9 each show a different embodiment of confirmative member 8. Referring to FIG. 8, pawls 8a of confirmative member 8 are integrally formed with elastic deformable pieces 8b each having a spring effect. When installing the conduit (see FIG. 3), elastic pieces 8b thrust against the side wall of opening 2a of joint body 2, resulting in an automatic shift to the secure state of conduit installation (see FIG. 4). This arrangement is more advantageous than a step of moving confirmative member 8 with hands. Referring next to FIG. 9, formed integrally on a ring of confirmative member 8 are the elastic pieces 8b, each having the spring effect, with which projections shaped on the outer peripheral portion of joint body 2 engage. The effect of this arrangement is the same as that in FIG. 8. Note that elastic pieces depicted in FIGS. 8 and 9 may be formed on joint body 2, and may be constituted in the form of a spring or the like spearately from confirmative member 8 or joint body 2. It should further be noted that branches 8c each extending substantially in the axial direction are formed on pawls 8a of confirmative member 8 in FIG. 10 for the purpose of facilitating the removal by outwardly expanding pawls 8a of confirmative member 8.

As discussed above, the connector for connecting the small diameter pipe according to the present invention exhibits the following effects. If conduit 1 is not normally connected to the connector, confirmative member is not allowed to move. Hence, the normal installation of conduit 1 can visually be observed with certainty by confirming the positional correlation between joint body 2 and confirmative member 8. In addition, the processes of positioning conduit 12 and preventing its removal can be performed more surely, because pawls 8a of confirmative member 8 act to catch pawls 4a of holder 4. Even when holder 4 is taken apart from joint body 2 because of a misoperation, confirmative member 8 functions to prevent the removal of conduit 1 from joint body 2, thereby enhancing the security. Besides, the removal of conduit 1 involves the steps of detaching both holder pawls 4a and confirmative member pawls 8a, and no trouble associated with the misoperation is thereby caused. The remarkably useful connector can thus be provided.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:

1. A connector for connecting a small diameter conduit, said conduit having an end, an outer peripheral surface and an annular protrudent wall spaced from the end, said connector comprising:

a joint body having an insertion bore extending axially therethrough for receiving the conduit, said insertion bore including a large diameter portion defining an inlet at one axial end of the joint body, a small diameter portion spaced from the large diameter portion and an intermediate diameter portion disposed intermediate the large and small diameter portions, at least one opening extending through the large diameter portion;

sealing means disposed in the intermediate diameter portion of the insertion bore for sealing engagement with the outer peripheral surface of a conduit inserted therein;

a holder having opposed ends, with a ring at one said end for engagement around the conduit and at least one elastically deflectable holder pawl at the opposed end, said holder pawl including a surface facing the ring for engaging the opening in the joint body and a tip facing away from the ring for engaging the annular protrudent wall of the conduit and retaining the conduit in the insertion bore of the joint body; and a confirmative member movable in the axial direction from the outside of the joint body and having at least one elastic confirmative pawl axially movable relative to the opening in the large diameter portion of the joint body and selectively engageable with the tip of the holder pawl, whereby the confirmative member is axially retained by the tip of the holder pawl prior to complete insertion of the conduit into the insertion bore of the joint body, and whereby the annular protrudent wall of the conduit urges the confirmative pawl out of engagement with the tip of the holder pawl to permit axial movement of the confirmative member upon complete insertion of the conduit into the joint body.

2. A connector as set forth in claim 1 wherein the holder comprises a pair of holder pawls and wherein the confirmative member comprises a pair of confirmative pawls.

3. The connector as set forth in claim 2, wherein said confirmative member includes elastic deformable pieces facing said joint body, said elastic deformable pieces acting to move said confirmative member in the axial direction when said holder pawls disengage from said confirmative pawls after normally installing said conduit.

4. The connector as set forth in claim 3, wherein said elastic deformable pieces are integrally shaped on said confirmative pawls.

5. The connector as set forth in claim 3, wherein said elastic deformable pieces are composed of elastic deformable parts integrally shaped on said ring of said confirmative member, said elastic deformable parts caught by corresponding projections provided on the outer peripheral portion of said joint body.

6. The connector as set forth in claim 2, wherein said confirmative member includes branches each extending in the axial direction from said confirmative pawls.

7. A connector as set forth in claim 1 wherein the holder pawl includes at least one groove selectively engageable by the confirmative pawl and wherein axial movement of the confirmative member enables engagement of the confirmative pawl in the groove of the holder pawl.

* * * * *